(12) United States Patent
Delaney et al.

(10) Patent No.: US 7,066,192 B1
(45) Date of Patent: Jun. 27, 2006

(54) VALVE SHUT OFF DEVICE

(76) Inventors: Brian Delaney, 3218 W. Williams, Phoenix, AZ (US) 85027; Greg Jones, 105 S. Irena Ave. #2, Redondo Beach, CA (US) 90277

( * ) Notice: Subject to any disclaimer, the term of this patent is extended or adjusted under 35 U.S.C. 154(b) by 128 days.

(21) Appl. No.: 10/912,725

(22) Filed: Aug. 4, 2004

(51) Int. Cl.
*F16K 31/05* (2006.01)

(52) U.S. Cl. .................. 137/15.18; 137/312; 137/78.1; 137/271; 251/129.04

(58) Field of Classification Search .............. 137/312, 137/269, 271, 78.1, 2, 15.01, 15.18; 251/129.04
See application file for complete search history.

(56) References Cited

U.S. PATENT DOCUMENTS

| | | | |
|---|---|---|---|
| 4,297,686 A | 10/1981 | Tom | 340/604 |
| 4,324,268 A | 4/1982 | Jacobson | 137/312 |
| 4,488,567 A | 12/1984 | Grant | 137/78.1 |
| 4,845,472 A | 7/1989 | Gordon et al. | 340/605 |
| 5,334,973 A | 8/1994 | Furr | 340/605 |
| 5,409,037 A * | 4/1995 | Wheeler et al. | 137/551 |
| 5,967,171 A | 10/1999 | Dwyer, Jr. | 137/78.1 |
| 6,025,788 A | 2/2000 | Diduck | 340/870.16 |
| 6,065,735 A | 5/2000 | Clark | 251/129.03 |
| 6,123,093 A | 9/2000 | D'Antonio et al. | 137/78.3 |
| 6,293,515 B1 | 9/2001 | Clark | 251/129.03 |
| 6,354,322 B1 | 3/2002 | Clark | 137/312 |
| 6,489,895 B1 | 12/2002 | Apelman | 340/605 |
| 6,662,821 B1 | 12/2003 | Jacobsen et al. | 137/312 |

* cited by examiner

*Primary Examiner*—Kevin Lee
(74) *Attorney, Agent, or Firm*—Ellis & Venable

(57) ABSTRACT

The invention is a valve shut off device that is easy to install and remove. The valve shut off device has at least one sensor, a receiver a set of interchangeable adapters, and a motor unit. The motor unit is attached to a valve handle by an adapter, and the sensor can communicate to activate the motor. When the sensor detects a leaking substance, the motor unit is activated and turns the valve handle to the "off" position. The adapters allow easy installation and removal of the valve shut off device. Additionally, the adapters accommodate a variety of valves making the system universal. Among other things, the valve shut off device allows a property owner to be absent from his or her property without the risk of a leak causing extensive damage.

20 Claims, 5 Drawing Sheets

VALVE SHUT OFF DEVICE

FIELD OF THE INVENTION

The present invention relates generally to an apparatus used for closing a valve, more particularly, to an apparatus that detects a leak and closes a water main valve before damage can occur. Specifically, the present invention utilizes a set of interchangeable adapters that allows the apparatus to be used on a variety of valve handles.

BACKGROUND OF THE INVENTION

An undetected water leak in a home or commercial building can cause extensive property damage if it is not caught in a timely manner. Homeowners who are away from their property for any amount of time runs the risk of returning to a flooded home that can require expensive repairs.

One way to stop the water flow is to shutoff the main water supply line to the home. Generally, the main water supply line is equipped with a main shutoff valve located at the point where the water enters the home. To prevent an undetected leak from causing damage, homeowners could shutoff the main water valve to the home each time they will be away for an extended period of time. However, this could become an inconvenience and is often impractical. Moreover, if homeowners forgot to shutoff the main water valve, it would be possible for a leak to go undetected.

The present invention provides homeowners with an alternative to manually shutting off the main water valve each time they are absent from their property. The present invention detects the presence of water leakage from various locations in a home and remotely takes action to shut off the flow of water by closing the main shutoff valve to the residence. Water sensors are placed throughout the home where there may be a high potential for a water leak, such as near toilets, washing machines, dishwashers, hot water heaters, sinks, etc. When any one of the water sensors detects a leak, the sensor activates the motor to shutoff the main water valve, thereby stopping the flow of water.

The motor is easily attached to the main water valve with an interchangeable adapter. The interchangeable adapter enables the motor to attach to a variety of valve handle mounting shafts and makes it possible for the homeowner to install and maintain the device without the assistance of a professional. Additionally, when the interchangeable adapter is used to mount the motor to the valve handle mounting shaft, it will remain balanced and not bind or be hindered in power.

The present invention also includes an anti-torque mount. The anti-torque mount is extendable from the bottom of the motor unit so that it straddles the pipe that is connected to the valve, but it is not permanently secured. This arrangement allows for easy adjustment of the anti-torque mount. Further, because the anti-torque mount is not permanently attached to the pipe, the entire valve shut off device can easily be removed from the valve without tools.

A current device used to detect leaks and close a valve can be found in U.S. Pat. No. 6,662,821 (Jacobsen et al.). Other information relevant to address the problem of detecting leaks and/or closing valves in general can be found in U.S. Pat. No. 64,488,567 (Grant), U.S. Pat. No. 6,489,895 (Apelman), U.S. Pat. No. 6,354,322 (Clark), U.S. Pat. No. 6,293,515 (Clark), U.S. Pat. No. 6,123,093 (D''Antonio et al.), U.S. Pat. No. 6,065,735 (Clark), U.S. Pat. No. 6,025,788 (Diduck), U.S. Pat. No. 5,967,171 (Dwyer Jr.), U.S. Pat. No. 5,334,973 (Furr), U.S. Pat. No. 4,845,472 (Gordon et al.), U.S. Pat. No. 4,324,268 (Jacobson), and U.S. Pat. No. 4,297,686 (Tom).

However, each of these devices suffers from one or more of the following disadvantages. First, the devices are difficult to install. They require a several step process that involves many parts, and the installation process makes it difficult to center the motor on the valve handle. If the motor is not centered on the valve handle, the motor will be out of balance and will bind and prevent the motor from shutting off the valve. The prior art devices are complicated and require a plumber or other professional to install and maintain.

Second, and most critically, the prior art devices do not adapt to a variety of valves. The prior art devices do not adapt to valve types that differ from the standard. This is a critical limitation of the prior art that the present invention overcomes. Finally, the anti-torque mount in the above devices is semi-permanently attached to the pipe. If it is not properly tightened, the motor on the device will bind. If the anti-torque mount is permanently secured to the pipe, it is difficult to remove the device in case of emergency because the anti-torque mount has to be unfastened from the pipe. The present invention overcomes this limitation by providing an anti-torque device that is not permanently attached to the pipe, yet does not bind the motor.

Presently, there is no water main shut off device that is easy to install and fits on a variety of water valves. For the foregoing reasons, a device that would allow homeowners to easily install a water valve shut off device that fits on a variety of water valve handles is desired.

SUMMARY OF THE INVENTION

It is an object of the present invention to provide a water valve shut off device that remotely takes action to shut off the flow of water by closing the main shut off valve to the building.

It is a further object of the present invention to provide a water valve shut off device that is easily installed.

It is a further object of the present invention to provide a water valve shut off device that fits a variety of water valve types to accommodate property owners with different designs of water valves.

It is a further object of the present invention to provide a water valve shut off device that can be easily and quickly removed in case manual operation of the valve is necessary.

It is a further object of the present invention to provide a water valve shut off device that detects leaks.

It is a further object of the present invention to provide a water valve shut off device where a sensor remotely activates the motor when a leak is detected.

It is a further object of the present invention to provide a water valve shut off device that quickly and easily secures the motor to the valve handle.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C § 112, paragraph 6 to define the invention. To the contrary, if the provisions of 35 U.S.C § 112, paragraph 6 are sought to be invoked to define the invention(s), the claims will specifically state the phrases "means for" or "step for" and a function, without also reciting in such phrases any structure, material, or act in support of the function.

Moreover, even if the provisions of 35 U.S.C. § 112, paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later developed equivalent structures, materials, or acts for performing the claimed function.

DESCRIPTION OF PREFERRED EMBODIMENTS

Figure 1:
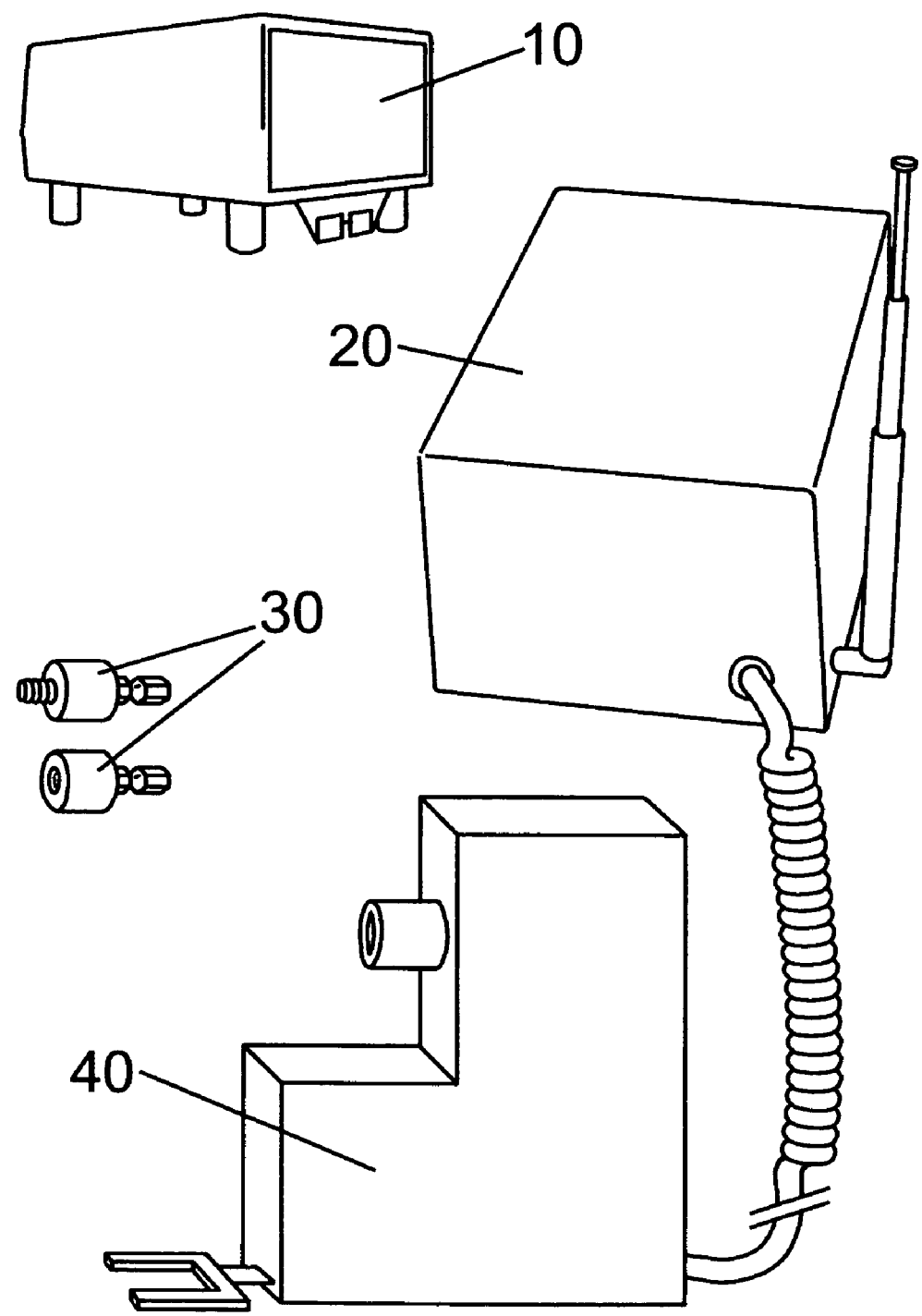
FIG. 1 shows a perspective view of the preferred valve shut off device.

As shown in FIG. 1, the preferred embodiment of the valve shut off device generally includes a sensor 10, a receiver 20, an adapter 30, and a motor 40. These components work together to detect a leak and shut off a water valve.

Figure 2:
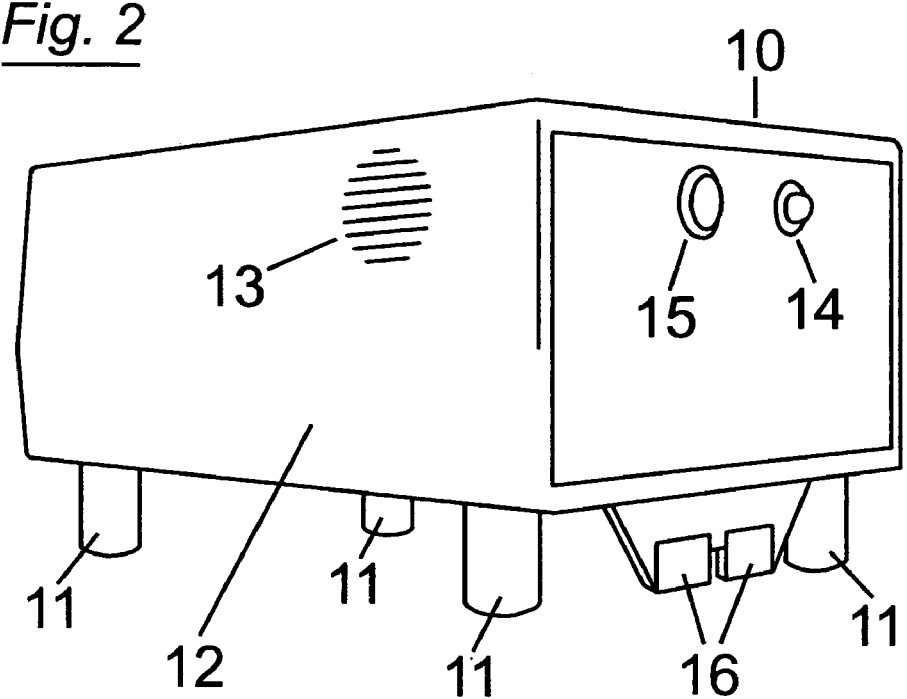
FIG. 2 shows a perspective view of the preferred sensor.

As shown in FIG. 2, the sensor 10 is compact for ease of placement and is contained in a weatherproof housing 12. The sensor 10 is typically battery powered, although any suitable power source could work. A low-battery alert 14 may be incorporated into the sensor 10 by providing an LED 14 to alert the homeowner. The sensor 10 has an audible notification element such as a speaker 13 and flashing LED 14 to alert anyone present of a detected leak. The sensor housing 12 is elevated by legs 11 to allow the free flow water under the housing 12. Additionally, a test button 15 for verification of signal transmission to the receiver 20 may be included along with an antenna to increase the signal transmission range. Finally, the sensor 10 should be free standing for ease of placement thereby enabling the sensor 10 to maintain its stationary position.

Figure 3:
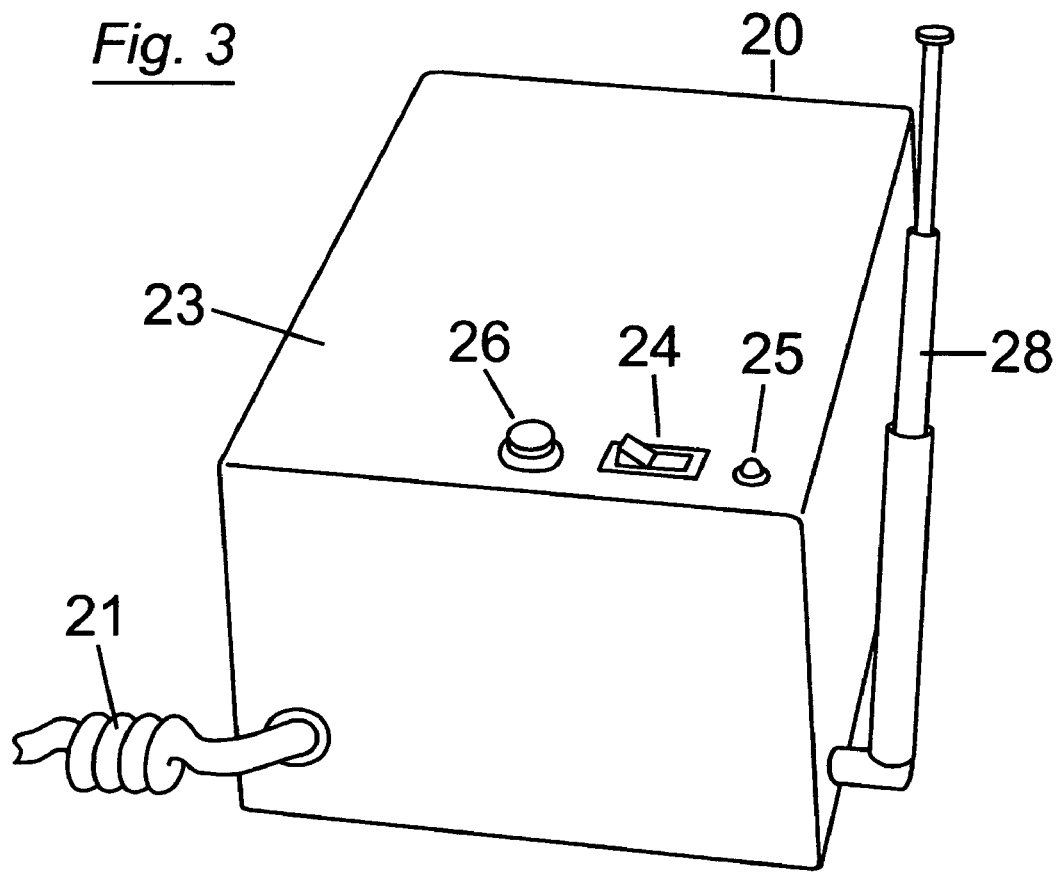
FIG. 3 shows a perspective view of the preferred receiver.

As illustrated by FIG. 3, in the preferred embodiment, the receiver 20 has a weatherproof housing 23 to protect the electrical components that detect the signal transmitted from the sensor 10. It is preferred that if batteries power the receiver 20, the receiver 20 may operate on a two-battery system: one battery for the receiver 20 and a second battery is unused until the motor unit 40 is activated should a leak occur. A low-battery alert 25 is included to signal the need to change the batteries. Further, the receiver 20 includes a test switch 24 for verification of signal reception from the sensor 10 without activating the motor unit 40. The LED 25 will indicate proper signal reception when lit.

In addition, the receiver 20 includes a circuit breaker. The circuit breaker will shut down the motor unit 40 when the valve handle 50 is completely shut off. Additionally, the LED 25 will turn on after the motor 40 is activated and will remain on until the system reset 26 is activated. Moreover, the receiver 20 includes an extendable antenna 28 to enhance signal reception from the sensor 10. The receiver 20 may have an AC power adapter if it can be located near an AC power supply. Rechargeable batteries can be used for an emergency backup if an AC power supply is used. Furthermore, an extendable cord 21 from the receiver 20 to the motor unit 40 allows flexible placement of the receiver 20 near the valve handle 50.

Figure 4:
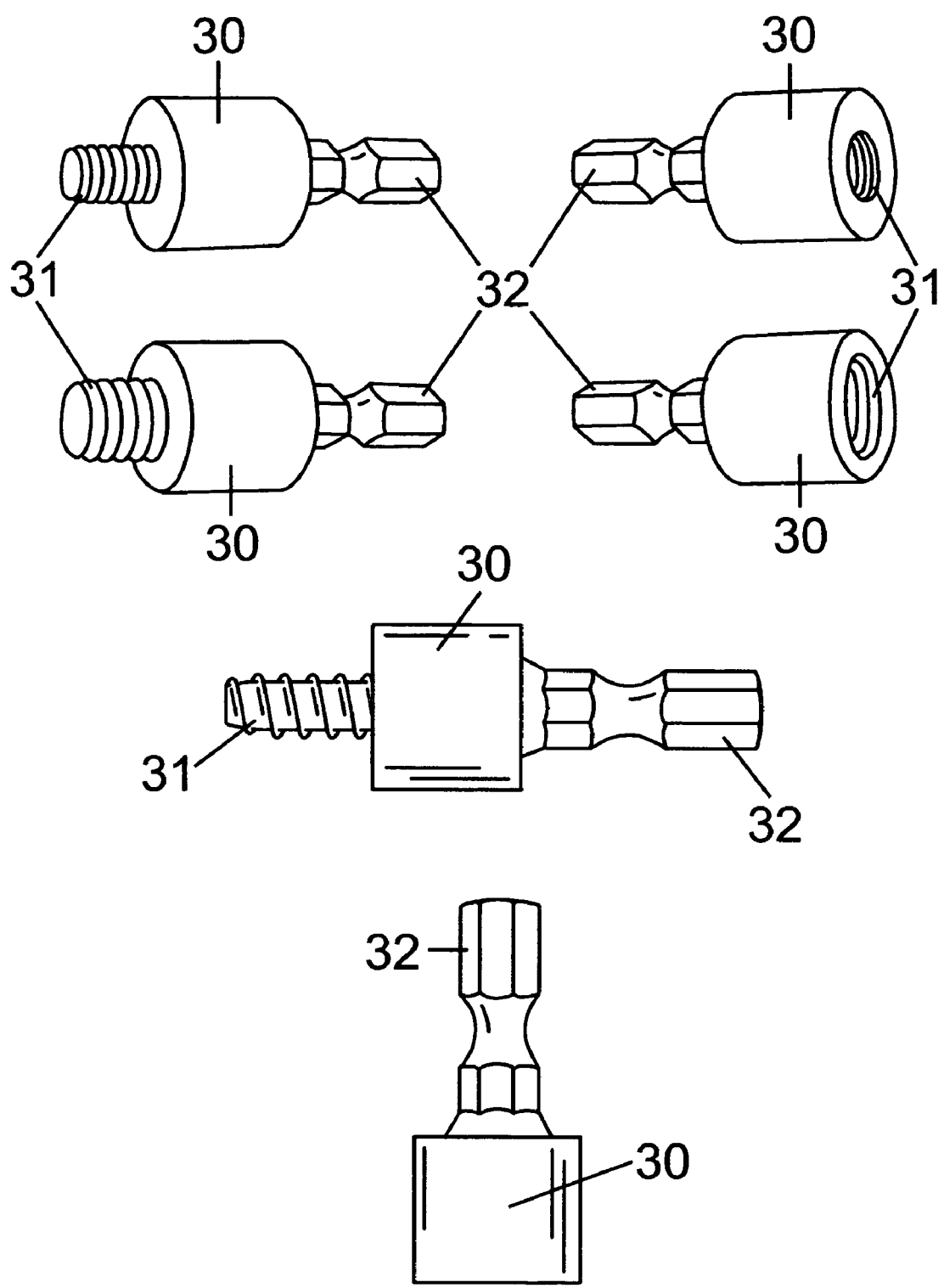
FIG. 4 shows a set of preferred interchangeable adapters.
Figure 5:
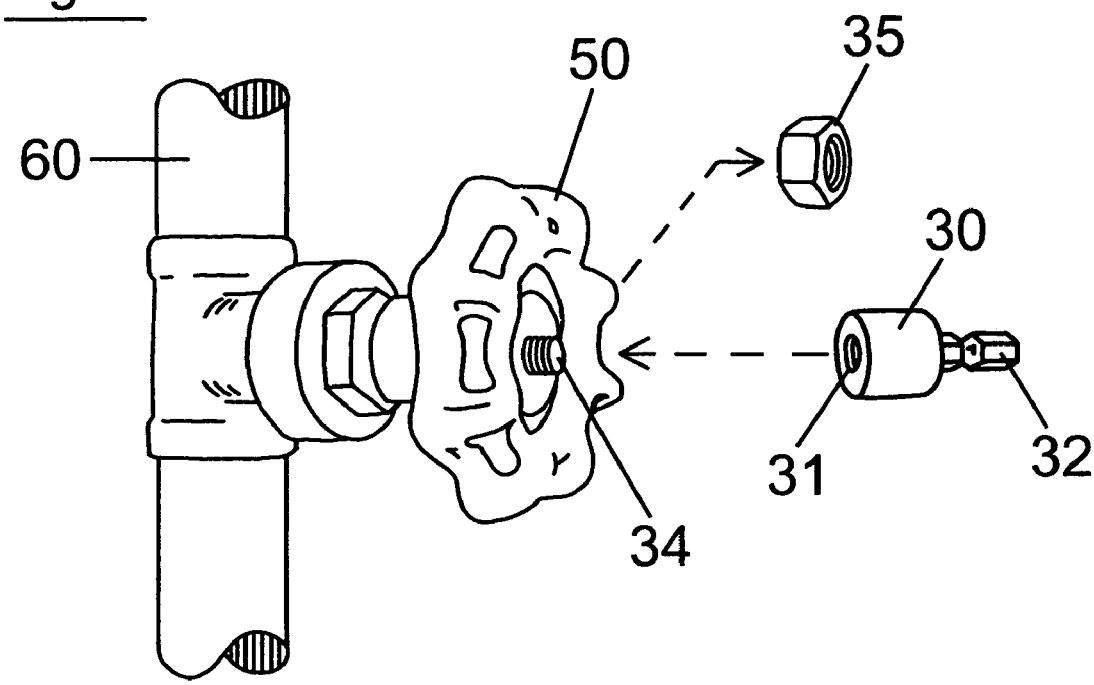
FIG. 5 shows the interchangeable adapters on two different valve handle types.
Figure 5:
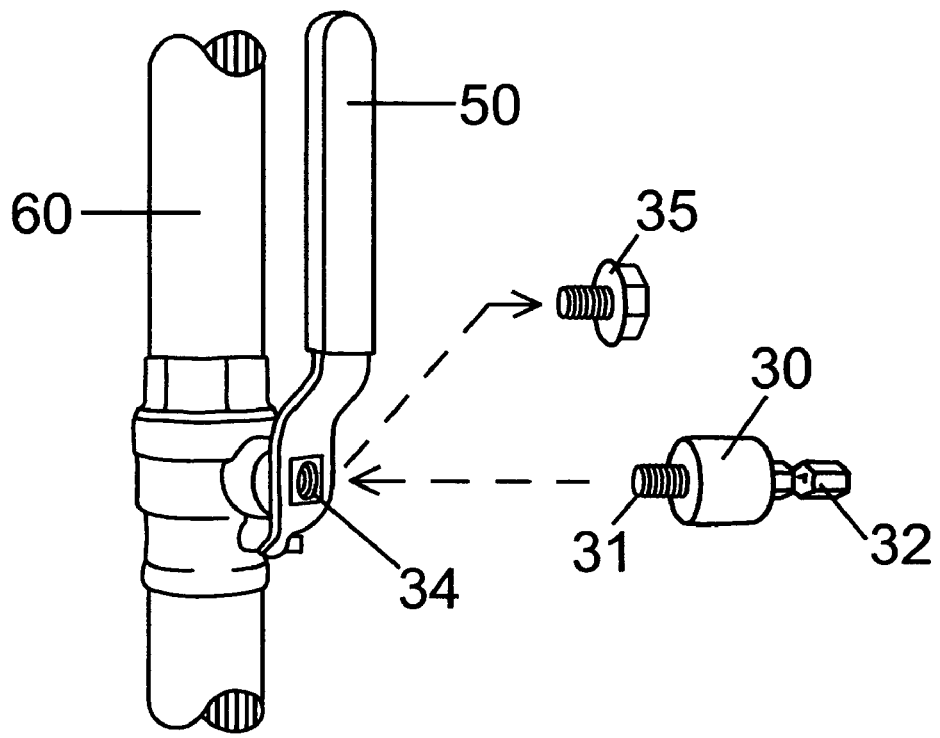

As shown in FIG. 4, a set of variably sized adapters 30 are included to attach the motor unit 40 to the valve handle mounting shaft 34. The unique set of variably sized adapters 30 allows the motor unit 40 to attach to many different types of valves. One side of the adapters 30 is threaded 31 and the other side is in the shape of a shaft 32. The threaded side of the adapter 31 replaces the existing nut or bolt 35 on the original valve by screwing onto the mounting shaft 34 where the nut or bolt 35 had been originally attached to the valve handle 50. The motor unit 40 connects to the shaft 32 side of the adapter 30. A guide plate for determining the proper adapter 30 size is included to aid users in determining the proper adapter 30 to use with the existing valve shaft. The motor 40 is safely located inside a weatherproof housing 42 to protect the components from the outdoor elements.

Figure 6:
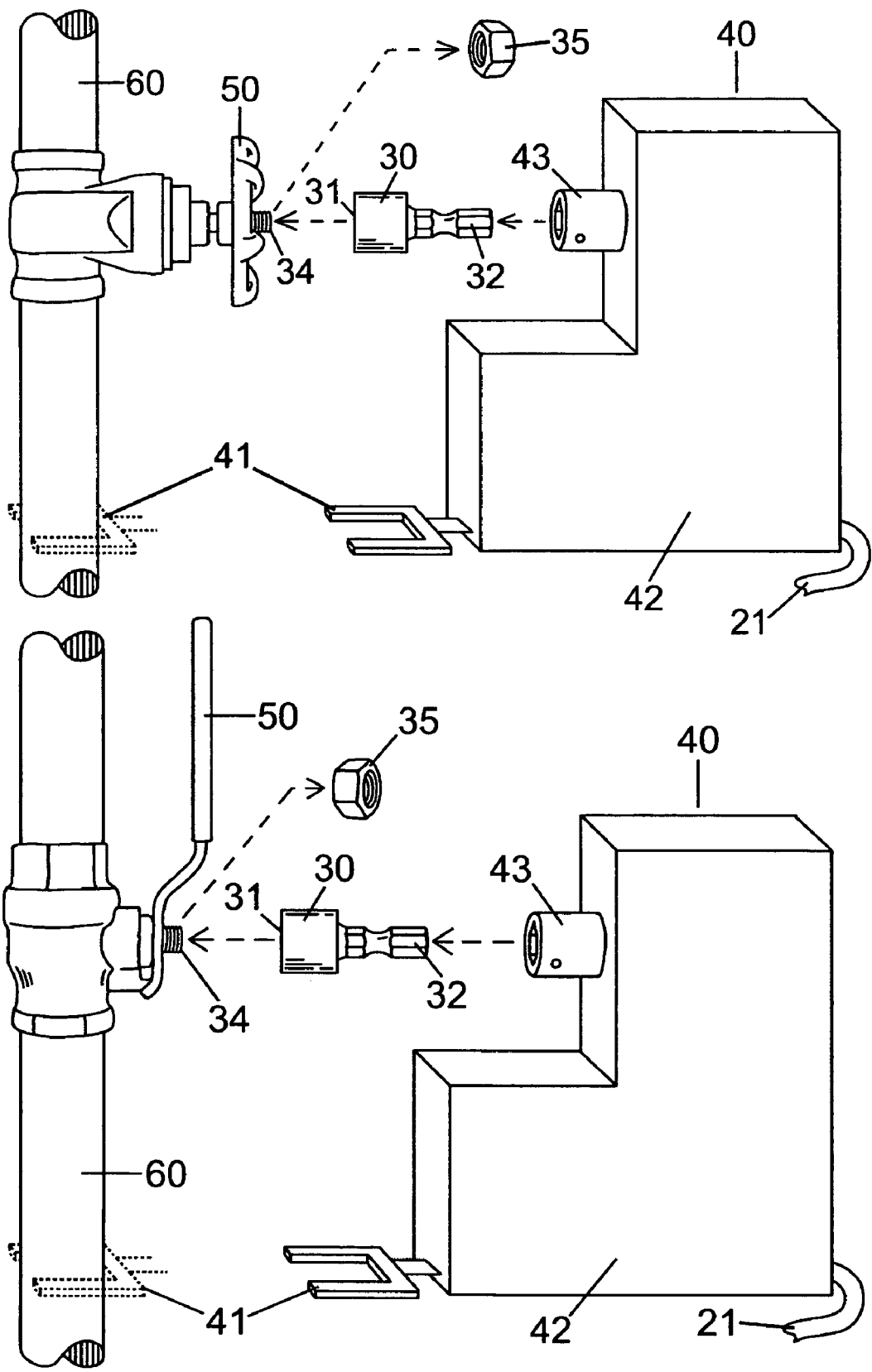
FIG. 6 shows a perspective view of the preferred motor unit.

As shown in FIG. 6, the motor unit 40 is secured to the valve handle 50. The use of an adapter 30 to mount the motor unit 40 enables the motor unit 40 to be properly secured on all designs and sizes of valve handles 50 (i.e., ball valves and rotating handle valves). This is critical so that the motor unit 40 remains balanced and will not bind or be hindered in power by the attached extendable anti-torque mount 41. The anti-torque mount 41 counter acts the torque created by the motor 40. Rather than being permanently or semi-permanently attached to the pipe 60 the extendable anti-torque mount 41 extends to straddle the pipe 60. This allows the user to easily adjust the extendable anti-torque mount 41 to accommodate the varying distances that the valve handles 50 may protrude from the pipe 60 depending on the shape and size of the valve handle 50 attached to the pipe 60. In addition, using the adapters 30 to attach the motor unit 40 to the valve handle 50 is preferred because when the motor unit 40 closes the valve, the motor unit 40 can quickly and easily be removed from the valve handle 50 without any tools, and the valve can be manually reopened. The motor 40 is then easily reattached to the adapter 30 on the valve handle 50, and the valve shut off device 100 is again ready to operate.

In addition, the motor unit 40 uses a gearing system to reduce the overall size and increase torque of the motor unit 40 and is capable of being mounted in a variety of positions to accommodate valves that are located in small or awkward places. The motor unit 40 is equipped with a one way ratcheting head 43 to make the installation easier when aligning the motor unit 40 to the shaft 32 of the adapter 30. Further, a clutch system on the head of the motor unit 40 may be desired to allow the motor unit 40 to build angular momentum before engaging the valve handle 50 to aid in closing corroded or tight valves.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A device for automatically shutting off pressurized valves comprising:
   A. a sensor,
   B. an interchangeable adapter,
   C. a motor,
   D. a valve handle,
   E. said valve handle coupled to a pipe,
   F. said interchangeable adapter further comprising:
      1. a front end, and
      2. a back end,
   G. said valve handle further comprising:
      1. a mounting shaft,
   H. said sensor is coupled to said motor such that said sensor activates said motor when said sensor detects a predetermined condition,
   I. said front end of said interchangeable adapter is coupled to the mounting shaft of said valve handle and said back end of said interchangeable adapter is coupled to said motor such that said motor rotates said valve handle when said sensor activates said motor, and
   J. said motor is secured to said pipe such that said motor remains stable when said motor rotates said valve handle.

2. The device for automatically shutting off pressurized valves of claim 1 wherein:
   A. said front end of said interchangeable adapter is threaded such that said threaded end of said interchangeable adapter secures to said mounting shaft on said valve handle, and
   B. said back end of said interchangeable adapter is a shaft such that said shaft is secured to said motor.

3. The device for automatically shutting off pressurized valves of claim 1 wherein:
   A. said motor further comprises a torque resistant mount such that said torque resistant mount is secured to said pipe so that when said motor rotates said valve handle, said motor remains stable.

4. The device for automatically shutting off pressurized valves of claim 3 wherein:
   A. said torque resistant mount further comprises a bracket such that said bracket is perpendicularly coupled to said pipe.

5. The device for automatically shutting off pressurized valves of claim 1 wherein:
   A. said sensor activates said motor when said sensor detects a liquid substance.

6. A device for automatically shutting off pressurized valves comprising:
   A. a sensor,
   B. an interchangeable adapter,
   C. a receiver,
   D. a motor,
   E. a valve handle,
   F. said valve handle being coupled to a pipe,
   G. said sensor further comprising a transmitter,
   H. said interchangeable adapter further comprising:
      1. a front end, and
      2. a back end,
   I. said valve handle further comprising
      1. a mounting shaft,
   J. said transmitter is electromagnetically coupled to said receiver such that said transmitter transmits a signal to said receiver when said sensor detects a predetermined condition,
   K. said receiver is coupled to said motor such that said motor is activated when said receiver receives said signal from said transmitter,
   L. said front end of said interchangeable adapter is coupled to the mounting shaft of said valve handle and said back end of said interchangeable adapter is coupled to said motor such that said motor rotates said valve handle when said motor is activated, and
   M. said motor is secured to said pipe such that said motor remains stable when said motor rotates said valve handle.

7. The device for automatically shutting off pressurized valves of claim 6 wherein:
   A. said front end of said interchangeable adapter is threaded such that said threaded end of said interchangeable adapter secures to said mounting shaft on said valve handle, and
   B. said back end of said interchangeable adapter is a shaft such that said shaft is secured to said motor.

8. The device for automatically shutting off pressurized valves of claim 6 wherein:
   A. said motor further comprises a torque resistant mount such that said torque resistant mount is secured to said pipe so that when said motor rotates said valve handle, said motor remains stable.

9. The device for automatically shutting off pressurized valves of claim 8 wherein:
   A. said torque resistant mount further comprises a bracket such that said bracket is perpendicularly coupled to said pipe.

10. The device for automatically shutting off pressurized valves of claim 6 wherein:
    A. said transmitter transmits said signal to said receiver when said sensor detects a liquid substance.

11. A method of shutting off pressurized valves comprising the steps of:
    A. coupling a sensor to a motor such that said sensor activates said motor when a predetermined condition occurs,
    B. coupling a valve handle to said motor, the valve handle further comprising a mounting shaft,
    C. coupling said valve handle to a pipe,
    D. coupling an interchangeable adapter to said valve handle and said motor, the interchangeable adapter further comprising a front end and a back end,
    E. coupling said front end of said interchangeable adapter to the mounting shaft of said valve handle, F. coupling said back end of said interchangeable adapter to said motor, G. using said motor to rotate said valve handle when said sensor activates said motor, and H. securing said motor to said pipe such that said motor remains stable when said motor rotates said valve handle.

12. The method of claim 11 further comprising the step of:

A. using said sensor to detect a liquid substance to activate said motor.

13. The method of claim 11 further comprising the step of:

A. securing said front end of said interchangeable adapter to said mounting shaft on said valve handle where said front end of said interchangeable adapter is threaded, and B. securing said back end of said interchangeable adapter to said motor where said back end of said interchangeable adapter is a shaft.

14. The method of claim 11 further comprising the step of:

A. coupling said motor to said pipe, said motor further comprising a torque resistant mount such that said torque resistant mount is secured to said pipe so that when said motor rotates said valve handle, said motor remains stable.

15. The method of claim 14 further comprising the step of:

A. coupling said torque resistant mount to said pipe, said torque resistant mount further comprising a bracket such that said bracket is perpendicularly coupled to said pipe.

16. A method of shutting off pressurized valves comprising the steps of:

A. using a sensor to detect a predetermined condition, said sensor further comprising a transmitter, B. coupling said transmitter to a receiver such that said transmitter transmits a signal to said receiver when said sensor detects said predetermined condition, C. coupling said receiver to a motor such that said motor is activated when said receiver receives said signal from said transmitter, D. coupling a valve handle to said motor, the valve handle further comprising a mounting shaft, E. coupling said valve handle to a pipe, F. coupling an interchangeable adapter to said valve handle and said motor, the interchangeable adapter further comprising a front end and a back end, G. coupling said front end of said interchangeable adapter to the mounting shaft of said valve handle, H. coupling said back end of said interchangeable adapter to said motor, I. using said motor to rotate said valve handle when said motor is activated, and J. securing said motor to said pipe such that said motor remains stable when said motor rotates said valve handle.

17. The method of claim 16 further comprising the step of:

A using said sensor to detect a liquid substance.

18. The method of claim 16 further comprising the step of:

A securing said front end of said interchangeable adapter to said mounting shaft on said valve handle where said front end of said interchangeable adapter is threaded, and B. securing said back end of said interchangeable adapter to said motor where said back end of said interchangeable adapter is a shaft.

19. The method of claim 16 further comprising the step of:

A. coupling said motor to said pipe, said motor further comprising a torque resistant mount such that said torque resistant mount is secured to said pipe so that when said motor rotates said valve handle, said motor remains stable.

20. The method of claim 19 further comprising the step of:

A. coupling said torque resistant mount to said pipe, said torque resistant mount further comprising a bracket such that said bracket is perpendicularly coupled to said pipe.

* * * * *